United States Patent [19]
Ditges

[11] 4,158,976
[45] Jun. 26, 1979

[54] DISCHARGE DEVICE FOR A WIRE CUTTER

[75] Inventor: Günter Ditges, Cologne, Fed. Rep. of Germany

[73] Assignee: Meyer, Roth & Pastor Maschinenfabrik GmbH, Cologne, Fed. Rep. of Germany

[21] Appl. No.: 841,993

[22] Filed: Oct. 13, 1977

[51] Int. Cl.² .................. B26D 7/06; B23D 36/00; B23D 25/04
[52] U.S. Cl. .................................. 83/157; 83/287; 83/289; 83/292; 83/364; 83/365; 83/370; 83/369; 83/372
[58] Field of Search ............... 83/157, 104, 198, 286, 83/287, 289, 290, 291, 292, 363, 364, 365, 368, 369, 370, 372, 23

[56] References Cited

U.S. PATENT DOCUMENTS

| | | | |
|---|---|---|---|
| 1,648,829 | 11/1927 | Sessions | 83/292 |
| 2,958,246 | 11/1960 | Foster | 83/372 X |
| 3,178,974 | 4/1965 | Roess | 83/287 X |
| 3,800,645 | 4/1974 | Alcock et al. | 83/287 X |

FOREIGN PATENT DOCUMENTS

| | | | |
|---|---|---|---|
| 562972 | 9/1923 | France | 83/292 |
| 244078 | 9/1971 | U.S.S.R. | 83/157 |

*Primary Examiner*—Donald R. Schran
*Attorney, Agent, or Firm*—Spencer & Kaye

[57] ABSTRACT

A wire cutting machine for consecutively severing predetermined wire lengths from a continuously fed wire of indefinite length, comprises a wire cutting device and a wire discharge device arranged downstream (as viewed in the direction of wire feed) of the wire cutting device. Th wire discharge device has a wire channel, the walls of which define an elongated channel space which is oriented in the direction of wire feed and within which the wire is advanced. In the channel wall a plurality of openings are provided which are arranged in the longitudinal direction at predetermined distances from one another. A wire length detecting arrangement is operatively connectible with the channel space through any selected one of the openings. As the wire length detecting arrangement senses the passage of the leading wire end in the channel space, it actuates the cutting device which severs a wire portion having a length corresponding to the distance from the shears of the cutting device to the selected opening in the wire channel.

22 Claims, 10 Drawing Figures

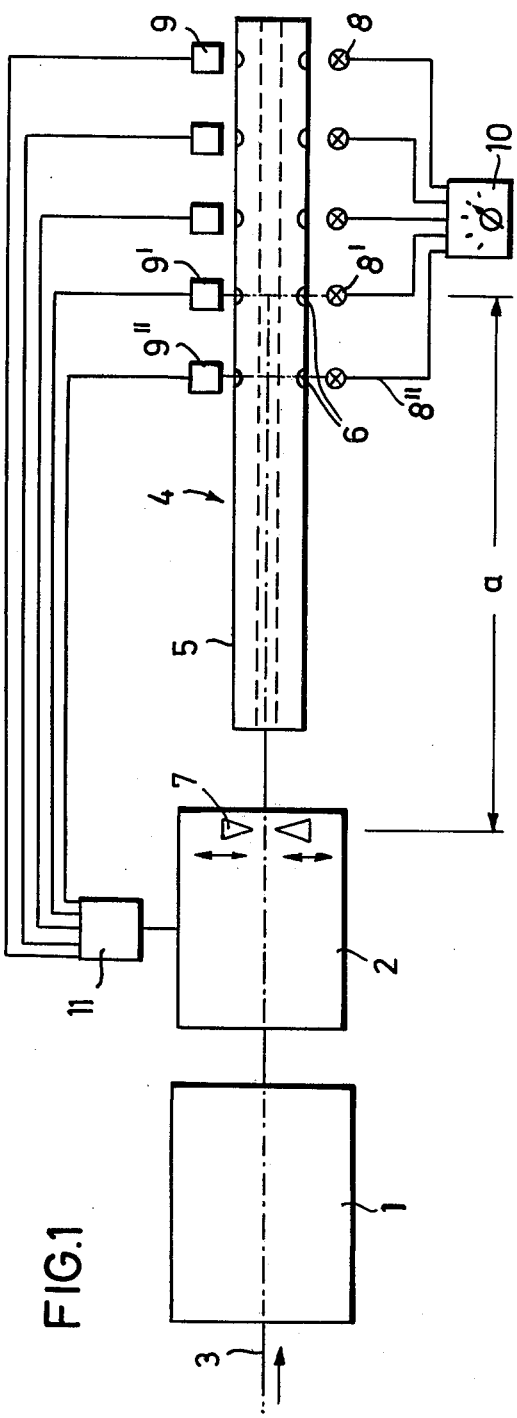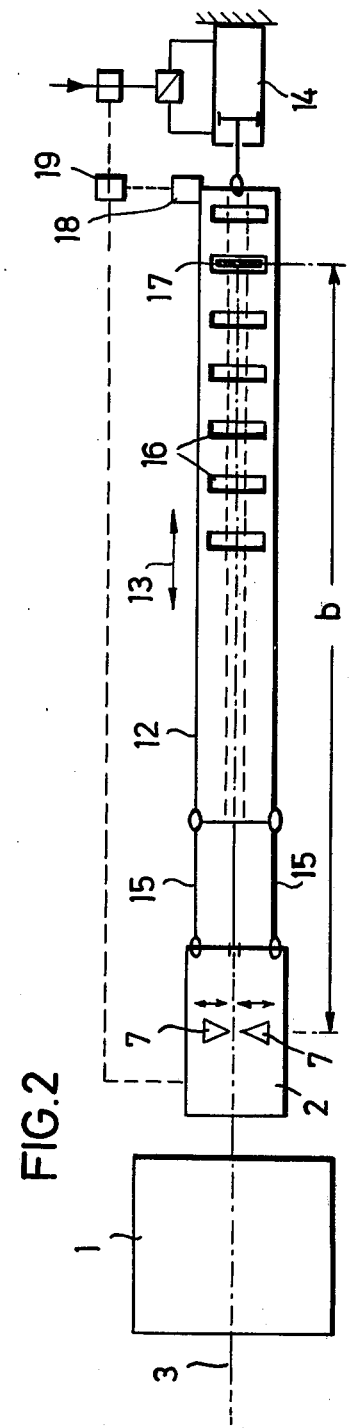

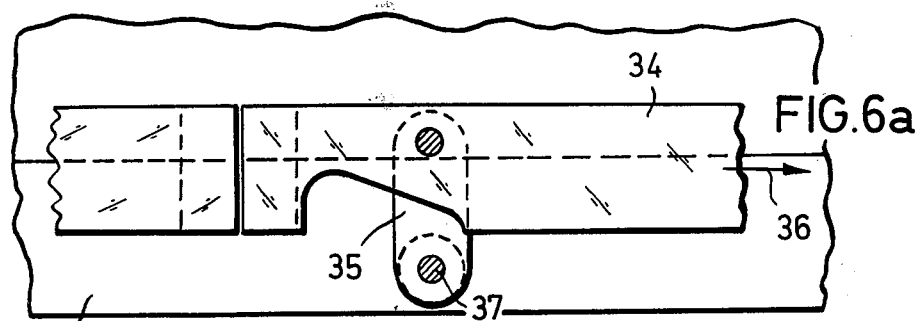
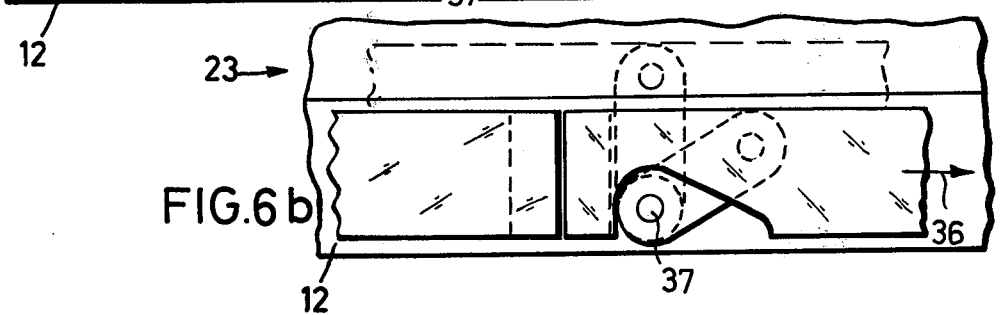
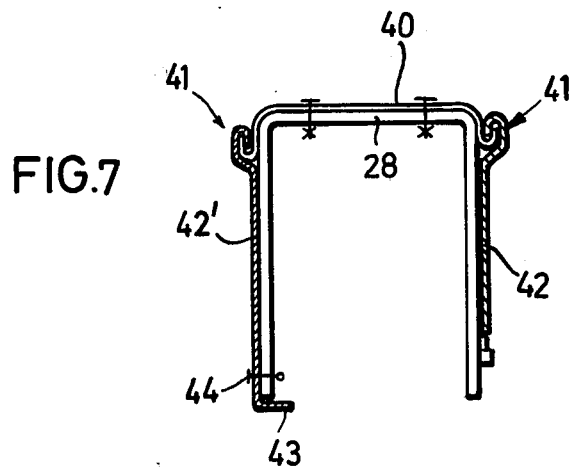
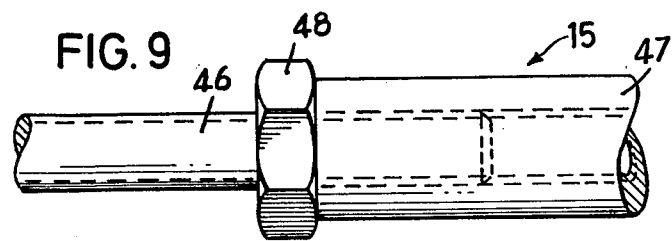

DISCHARGE DEVICE FOR A WIRE CUTTER

BACKGROUND OF THE INVENTION

This invention relates to a discharge device for a wire cutting machine for severing predetermined and presettable lengths of continuously fed wire. The discharge device includes a wire channel provided with a closing arrangement and a wire length detecting arrangement which is associated with the wire channel and which is operatively connected with control elements for triggering the cutting device and the closing arrangement.

German Accepted Published Patent Application (Auslegeschrift) Nos. 1,108,647 and 1,402,141 disclose apparatuses for cutting adjustable wire lengths from a continuously advanced wire wherein the shears are controlled by the wire advancing device (expediently with the aid of a steplessly variable stepdown gear) which forwards the wire to the cutting device. This operational mode has the disadvantage that the wire length to be cut is detected always indirectly and therefore slippage between the wire feeding arrangement and the wire advanced thereby constitutes an error in the length determination. The detection of wire lengths is thus effected always via that part of the endless wire which is upstream of the cutting device, so that significant deviations may occur between the "measured" wire length and the severed actual wire length.

German Accepted Published Patent Application (Auslegeschrift) No. 1,931,154 discloses a wire cutting machine in which the length detection occurs downstream of the cutting device when viewed in the direction of wire feed. For this purpose there is provided a pivotal body which has two downwardly open wire channels. The latter, at their ends oriented away from the cutting device, are provided with abutment rods which are longitudinally displaceable and length-adjustable. Further, the abutment rods are arranged to operate a switch affixed to the machine frame. In this manner the wire length entering the wire channel actuates the switch with the intermediary of the abutment rod disposed in the respective wire channel upon impact with the abutment rod. As a result of the switch actuation, a drive is energized which causes the pivotal body to swing and simultaneously, the shears coupled with the pivotal body sever the wire. By virtue of the swinging motion of the pivotal body, the severed wire portion is ejected and simultaneously, the new leading end of the wire may be introduced into the other channel. Although this arrangement which operates as a length abutment control, brings about an improvement in the uniformity of the length of the severed wire portions, it has, nevertheless, the disadvantage that the setting of the machine to different wire lengths is complicated and time consuming. The machine has to be stopped for each length adjustment, the abutment rod has to be released, adjusted and re-inserted and the new desired length has to be verified. It is a further disadvantage of this known machine that the desired wire lengths to be severed are adjustable only within relatively narrow limits, because the maximum length of the setting rods projecting freely into the wire channel is limited for reasons of stability.

SUMMARY OF THE INVENTION

It is an object of the invention to provide a wire discharge device of the above type including a length-dependent cutter control which ensures a wide-range length selection, which makes possible a wire cutting operation by electronic program control with a wide-range length selection without the need to stop the machine and apart from these, ensures more rapid length settings.

These objects and others to become apparent as the specification progresses, are accomplished by the invention, according to which, briefly stated, the wire cutting machine for consecutively severing predetermined wire lengths from a continuously fed wire of indefinite length, comprises a wire cutting device and a wire discharge device arranged downstream (as viewed in the direction of wire feed) of the wire cutting device. The wire discharge device has a wire channel, the walls of which define an elongated channel space which is oriented in the direction of wire feed and within which the wire is advanced. In the channel wall a plurality of openings are provided which are arranged in the longitudinal direction at predetermined distances from one another. A wire length detecting arrangement is operatively connectable with the channel space through any selected one of the openings. As the wire length detecting arrangement senses the passage of the leading wire end in the channel space, it actuates the cutting device which severs a wire portion having a length corresponding to the distance from the shears of the cutting device to the selected opening in the wire channel.

The above-outlined arrangement has the advantage that the channel may be provided with discrete openings along its entire length so that the same machine will be capable of cutting wire lengths of, for example, from 1 meter to several meters.

The wire length detecting sensors may be constituted by light barriers of inductive or capacitive detectors, the output signal of which is applied to drive arrangements for operating the cutting and closing devices. The transverse openings may be uniformly spaced in the channel wall; the distance between adjoining transverse openings corresponds to the smallest desired length increment. The wire length detecting operation may be performed by a single, relocatable sensor associated with the wire channel, so that for an adjustment of the desired wire length it is sufficient to relocate the sole sensor on the wire channel into the predetermined, tested length positions without the aid of any additional tool. Since the length increments are predetermined by the spacing between the transverse openings, there is no need for performing time consuming and circumstantial measurements; the sensor merely has to be assigned to that transverse opening which corresponds to the desired wire length.

It is a further advantage of the invention that the length selection may be effected from a central control panel particularly if electrically operating sensors such as, for example, optical barriers or the like are used as the length detecting arrangements. In these arrangements then, expediently, with each discrete opening there is associated a separate sensor which may be activated from the control panel corresponding to the desired wire length. This arrangement further has the advantage that with a proper setting of the circuitry, delays in the triggering of the individual operations may be compensated for.

According to an advantageous feature of the invention, the discrete openings are constituted by slots which extend transversely to the channel axis and further, in each slot an abutment member may be slidably inserted to constitute a wire length detecting means. By virtue of the fact that the wire length to be cut from the wire moves against the abutment member and thereafter is not displaced with respect to the cutting device after impact with the abutment member, there is ensured a high precision for the cut length. Changes in the length to be cut may be effected by a simple relocation of the abutment member. The latter is coupled with switch elements which in turn are connected with the control elements. In accordance with a further advantageous feature of the invention, with each slot there is associated a separate abutment member coupled to a setting means. This arrangement has the advantage that even in case of mechanical (contacting) wire length detecting means, a remote control is feasible because at all times that abutment member which is associated with the desired length may be advanced into its associated slot by means of a remote-controlled setting arrangement. It is a further advantage of this arrangement that the idle abutment members (that is, those abutment members which in a given cutting operation are not needed for the length detection) may be utilized as ejection means in case the severed wire portion is jammed in the channel. For this purpose the abutment members are arranged to be insertable into their respective slot in the direction of wire discharge.

Particularly if abutment members are used as the length detecting means, a further feature of the invention provides that the entire wire channel is supported in such a manner that it is shiftable in the direction of its length and, at one end, it is coupled with a motion-sensing signal transmitter. The signal transmitter (for example, a microswitch, an acceleration sensor or the like) which serves for triggering the cutting operation, is actuated by the longitudinal motion (which may be abrupt) of the wire channel at the moment the leading end of the wire abuts the abutment member. This arrangement has the advantage that simple metal pieces can be used as relocatable abutment members which may be moved either manually or by appropriate setting devices, such as electromagnets. No additional connecting members are needed for individually coupling the abutment members with the signal transmitter for controlling the cutting operation, since the triggering of the required motions involved in the cutting operation is effected in response to a sole signal transmitter.

In accordance with a further advantageous feature of the invention, the wire channel is provided with a drive arrangement to effect a reciprocating motion of the wire channel; the drive arrangement is coupled with the control elements of the wire length detecting means. This arrangement has the advantage that even if location-bound abutment members are used as the length detecting means, due to a longitudinal motion of the wire channel (which carries with it the abutment members) effected by the drive arrangement, the cutting operation may be performed even if the wire is continuously advanced, because the wire channel, during the duration of the cutting operation, moves with the feed advance speed in the wire feed direction ensuring in this manner that a sufficient time is available for the cutting operation. The wire channel is, subsequent to the ejection of the severed wire portion, during the period in which the new wire portion is fed into the wire channel, again withdrawn into its initial position by the drive arrangement which has been reversed (switched) in the meantime.

According to a particularly advantageous feature of the invention, the wire channel is connected with the actuating mechanism of the cutting device by means of at least one coupling member. This arrangement has the advantage that by means of the longitudinal shift of the wire channel, simultaneously the cutting operation is either triggered or the same may be operated in synchronism with the motion of the wire feed or, as the case may be, the channel shift, so that only a single drive arrangement is required for both machine parts, whereby a simplification of the control circuit is possible, because only a single drive arrangement has to be controlled. According to a further feature of the invention, the coupling member is length-adjustable. Since the shears of the cutting device represent the "0-point" of the length detection effected in the wire discharge device, even in predetermined fixed distances between the individual transverse openings for receiving the length-detecting means any desired length may be set because any required "inbetween" dimensions which cannot be detected because of the particular, fixed distances between the transverse openings, may be preset by a corresponding length adjustment of the coupling member.

In accordance with the invention, the drive arrangement may be omitted if it is ensured that the wire is advanced with a force that is sufficient to deliver work effecting a shift of the wire channel and performing the cutting operation.

In accordance with a further feature of the invention, the closing device of the wire channel has at least one closing strip shiftable over the open channel side and connected with an actuating means. This arrangement provides that the wire portion to be cut first runs into a channel which is closed at all sides and, upon completion of the cutting operation, the wire channel is opened along its entire length, so that the the severed wire portion may fall out of the wire channel. The actuating means may comprise, according to the invention, either an own, separately controllable drive or may be so structured that in case of a closing strip supported on pivotal levers secured to the channel body, one end of the closing strip is brought into operational connection with a spatially fixed location, so that during a longitudinal motion of the wire channel, the closing device is positively openable in an adjustable manner with respect to the cutting operation.

In accordance with a further feature of the invention, the wire channel, including its closing strip, is, when viewed lengthwise, formed of a plurality of interconnected parts. This permits a construction of the wire discharge device in accordance with a module principle, so that with the same modules wire discharge devices of different lengths may be made or already-existing wire discharge devices may be extended without difficulty.

In accordance with still another feature of the invention, for the securing of the wire channel there is provided a stand which has downwardly open, U-shaped yokes to which the wire channel is attached. This arrangement makes possible to arrange the wire channel in a suspended manner, that is, to secure the same to carrier arms or the like, so that a free space is provided underneath the wire channel for storage or conveyor devices. In longitudinally displaceable wire channels at least one support roller is provided preferably at the free end of each leg of the yokes for displaceably supporting the wire channel.

BRIEF DESCRIPTION OF THE DRAWINGS

FIG. 1 is a schematic plan view of a preferred embodiment of the invention operating with wire length detection without contacting the wire.

FIG. 2 is a schematic top plan view of another preferred embodiment of the invention operating with wire length detection by means of mechanical contacting.

FIGS. 6a and 6b are plan views of a detail of the structure shown in FIG. 5, in two different operational positions.

FIG. 7 is a front elevational sectional view of a detail of a machine stand for supporting the structure shown in FIG. 5.

FIG. 9 is a partial view of an example for a length adjustable coupling member between the wire channel and the cutting device.

DESCRIPTION OF THE PREFERRED EMBODIMENTS

Figure 3:
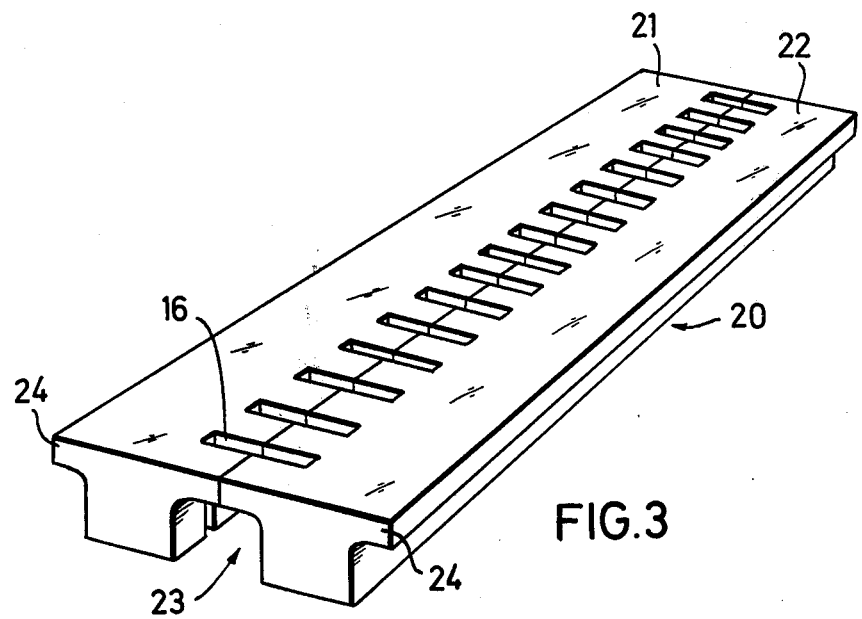
FIG. 3 is a perspective view of a component of the embodiment illustrated in FIG. 2.

Turning now to FIG. 1, there is schematically illustrated, in top plan view, an apparatus for cutting straightened lengths from a continuously advanced wire. The apparatus comprises a wire straightening device 1 of known construction. Downstream of the wire straightening device—as viewed in the direction of wire feed—there is arranged a cutting device 2, preferably of the type comprising "flying shears." The wire 3 of indefinite length is continuously fed into the wire straightening device 1 and is advanced by the latter as a straightened rod of indefinite length to the cutting device 2. Downstream of the cutting device 2 there is arranged a wire discharge device 4 to handle the wire lengths before and after cutting. Essentially, the wire discharge device 4 comprises a downwardly open wire channel 5 which is provided with a closing device (not visible in FIG. 1). By means of the closing device the wire channel is closed at all sides during the passage of the wire 3 in the channel and, after the cutting operation, the channel is opened along its entire length to permit the severed wire length to fall out of the channel.

The wire channel 5 is provided with a plurality of discrete openings 6 for the length detection of the wire. The openings 6 are spaced uniformly from one another, for example, at a distance of 50 mm; the opening series extends, dependent upon the operational range of the wire discharge device along the length of the channel, the distance of the first discrete opening 6 from the schematically indicated shears 7 of the cutting device 2 is determined by the desired minimum length of the wire portions to be cut. In the illustrated embodiment optical barriers are provided for effecting a wire length detection which operates without contacting the wire. The optical barriers are formed in a conventional manner of a light source 8, 8', 8'', etc. and a receiver 9, 9', 9'', etc. which are associated pairwise with respective discrete openings in such manner that the light beam emanating from the light source impinges on the associated receiver after having traveled through the associated discrete opening 6. The light sources 8, 8', 8'', etc. are coupled by means of a preselector switch 10 to a current source, so that with a corresponding selection of one light source, for example, the light source 8', a length a from the shears 7 of the cutting device 2 may be set. The receivers 9, 9', 9'', etc. are connected to a control device 11 by means of which the drive (not shown) for the cutting device 2 is controlled. This drive moves the cutting device 2 in the direction of wire feed and also effects the cutting motion of the shears 7. If, for example, by virtue of selecting the light barrier 8', 9', the predetermined length is a, at the moment the leading end of the wire advanced in the wire channel 5 passes the light barrier 8', 9', the receiver 9' applies a signal to the control device 11 which thus initiates the cutting operation, whereupon a wire portion of the predetermined length a will be severed. In view of the fact that the wire 3 is fed continuously, during the return motion of the cutting device 2, a new wire portion already advances in the wire channel 5 so that, as the new leading end of the wire reaches the operative light barrier, the cutting operation is repeated. By means of the selector switch 10 which may be operated, for example, from a central control panel, or may be controlled by a process computer, any desired length in any desired number may be severed, for example, by a predetermined program, according to the length increments structurally determined by the distance between the discrete openings 6.

Dependent upon the particular type of the drive arrangement, it may be expedient to simultaneously activate two light barriers: the activated upstream light barrier (e.g. the light barrier 8'', 9'') is designed to set in motion the associated drive arrangements in response to the passage of the leading end of the wire, so that immediately as the wire terminus moves past the activated downstream light barrier (e.g. the light barrier 8', 9'), the severing operation can be performed without delay.

Instead of light barriers, other "no contact" sensors, e.g. of the inductive or capacitive type, may be used. In such a case it is not necessary that the discrete openings 6 pass entirely through the channel wall, it is sufficient if the openings merge thereinto.

Turning now to FIG. 2, there is schematically illustrated, in top plan view, a further preferred embodiment of the invention which operates on a principle different from that shown in FIG. 1. The wire 3 (pulled from a supply reel, now shown) first passes through a straightening device 1 and thereafter moves through a cutting device 2. With the cutting device there is associated a wire channel 12 which, similarly to the wire channel 5 of the embodiment shown in FIG. 1, is downwardly open along its entire length and may be closed by a closing device, not shown. Departing from the first-described embodiment, the wire channel 12 is supported to be longitudinally displaceable in the direction of the double-headed arrow 13 and is connected with a drive 14 formed, for example, by a power cylinder unit. By means of a coupling member 15, the wire channel 12 is connected with the cutting device 2 which too, is longitudinally displaceably supported.

The wire channel 12 has, on its upper side, slot-like discrete transverse openings 16 merging into the channel space.

The setting of the wire length to be severed (for example, the length b) is effected by means of an abutment member 17 inserted into the proper transverse slot 16. The wire channel 12 is provided with a sensor 18 only at one location. In the illustrated example, for the sake of simpler illustration, the sensor 18 and the drive 14 are arranged at the downstream end of the wire channel 12. In the actual structure it may be expedient to arrange both the sensor 18 and the drive 14 at the upstream end of the wire channel 12. Expediently, in such a case the cutting device 2 together with the sensor 18 and the drive 14 may be manufactured as a compact structural unit to which there are attached further components of the wire channel in accordance with the desired channel length.

The sensor 18 is connected with a control device 19 which controls the drive 14 and the drive for the cutting device 2.

As soon as the leading terminus of the wire running in the wire channel 12 abuts against the abutment member 17, the sensor 18 which, for example, senses accelerations in the direction of the arrow 13, emits a starting signal for the drive 14 through the control device 19 and, as a result, the wire channel 12 shifts, approximately with the traveling speed of the wire, in the direction of wire feed. Simultaneously, the control device 19 initiates the cutting operation so that after opening the non-illustrated closing device, the severed wire portion may be dropped downwardly out of the channel 12. The closing device may be provided either with its own drive which can be controlled by the control device 19 or may be opened by an actuating mechanism which is triggered mechanically by the motion of the wire channel 12 effected codirectionally with the wire feed.

In the FIG. 2 embodiment too, the distances between the individual transverse openings and thus the length increments for the length portions to be severed are predetermined. In the embodiment according to FIG. 2 it is, however, feasible to cut intermediate lengths as well. Such a result can be achieved by providing that the coupling member 15 is length-adjustable so that, by means of a corresponding length alteration of the coupling member 15, the distance of the particular transverse opening 16 may be altered with respect to the "0-point" representing the location of the shears 7 of the cutting device 2.

According to an advantageous feature of the invention, the wire channel 5 (FIG. 1) or 12 (FIG. 2) is subdivided in its length into several identical length portions which may be attached in series during assembly according to the desired total length of the wire channel. FIG. 3 illustrates an embodiment of a modular length component adapted to be used in the embodiment shown in FIG. 2. For manufacturing reasons, for example, in case the guide slots (transverse openings) for the abutments are to be milled in an economical manner, each channel element (module) is formed of two symmetrical longitudinal halves 21 and 22 firmly attached to one another with connecting elements (not shown). Each module 20 is of identical configuration and has along its length a plurality of slot-like transverse openings 16 which are spaced uniformly from one another on the top side of the module and which communicate with the downwardly open channel space 23. Each module is provided at opposite longitudinal sides with a laterally projecting flange 24 by means of which the entire wire channel, formed of the individual modules, is guided in a machine stand which will be described later in greater detail.

Figure 4:
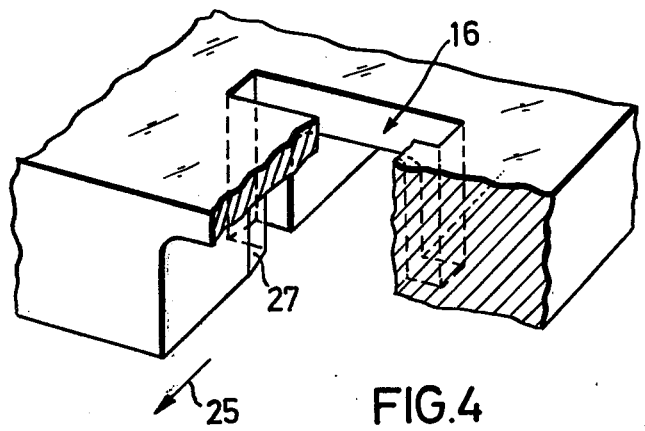
FIG. 4 is a fragmentary perspective view, partially in section, of a detail of the structure shown in FIG. 3.

FIG. 4 illustrates, on an enlarged scale, a part of the module 20 in the zone of one of the slots 16. It is seen that the length of the slot is somewhat greater than the width of the channel space 23 to ensure that a sufficient stabilizing support is formed for the abutment member 17 (FIG. 2) which is to be inserted into the slot 16. The downstream edge (as viewed in the wire feed direction 25) formed by the channel wall at each slot 16, is provided with a chamfer to ensure that an abutting or jamming of the wire at these edges is avoided.

Figure 5:
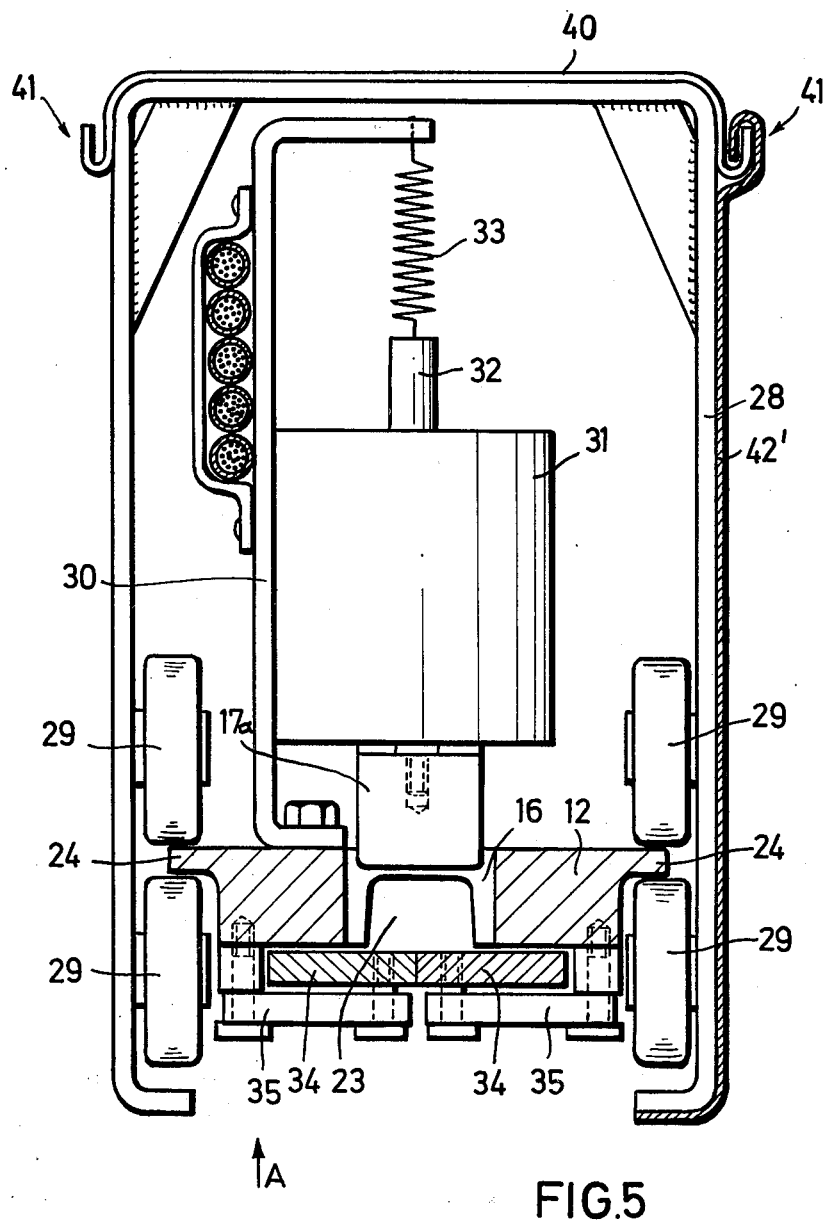
FIG. 5 is a sectional front elevational view of a structural embodiment of the arrangement illustrated in FIG. 2.

Turning now to FIG. 5, there is illustrated, in end elevation, substantially the entire structure of a wire discharge device according to the invention. Also referring to FIG. 8, the wire channel 12 and related structure are supported along their length by longitudinally spaced yokes 28, each carrying, at the lower, free end portion of its vertically oriented legs, two rollers 29, forming a roller pair. The flanges 24 on opposite sides of the wire channel 12 project into the space between the rollers of each roller pair to thus provide a longitudinally slidable support for the wire channel 12. To the upper face of the wire channel 12, in the measuring zone, above each slot-like transverse opening 16, there is secured a bracket 30 which carries a moving-coil solenoid 31. A solenoid armature 32 is suspended from the bracket 30 by means of a soft spring 33. At the lower terminus of the armature 32 there is secured an abutment plate 17a which is aligned with the associated transverse slot 16 and which, in the withdrawn position shown in FIG. 5, ensures a free passage of the wire advanced in the channel space 23. For setting the desired wire length to be cut, the armature 32 of the respective abutment plate 17a is pulled downwardly by virtue of the energization of the associated solenoid 31 so that the channel space 23 is at the desired location blocked by the selected abutment plate 17a.

The open underside of the wire channel may be closed off by the channel closing device which comprises two longitudinally extending closing strips 34 secured to the wire channel 12 by means of separate pivotal levers 35. FIG. 6a shows, in plan view, one of the pivotal levers 35 secured to the associated closing strip 34. The illustration in FIG. 6a is a view taken in the direction of the arrow A of FIG. 5. Each closing strip 34 extends over the entire length of the wire channel and, in case the wire channel is formed of several length portions as described earlier in connection with FIGS. 3 and 4, the closing strips 34 are formed of several length portions as well. If now, as shown in FIGS. 6a and 6b, a force is exerted on the two closing strips 34 in the direction of the arrow 36, the levers 35 swing about their stationary pivot points 37, so that the two closing strips 34, which are arranged as mirror images of one another, are shifted along the entire channel length outwardly, thus opening the underside of the channel space 23 in its entire length. The closing strips 34 may be provided either with their own drive or may be secured to the machine stand in such a manner that in case of a longitudinal displacement of the wire channel, the above-described opening motion of the closing strips 34 will take place.

While in connection with the FIG. 2 embodiment there is described a manually relocatable abutment member 17, the embodiment illustrated in FIG. 5 shows mechanical abutment members 17a which are shaped identically to the embodiment in FIG. 2 but which may be remote-controlled. As already described earlier, above each transverse opening 16 in the measuring zone there is arranged an abutment member (abutment plate) 17a which can be controlled by an associated moving-coil solenoid 31 and which makes possible that with remote control the desired length can be set by energizing the solenoid of the selected abutment member. Thus, the leading terminal portion of the wire advanced in the wire channel first runs through the downwardly closed channel space 23 up to the actuated abutment plate 17a and then, triggered by the impact between the abutment plate 17a and the leading end of the wire 3, the longitudinal shift of the entire arrangement takes place as described in connection with FIG. 2. As soon as the desired length is severed from the advancing wire of indefinite length, the two closing strips 34 pivot away from one another and thus open the channel space 23 downwardly, allowing the severed wire portion to drop out of the channel. In order to accelerate this step, it is expedient to actuate some or all of the other solenoids along the cut wire length to thus effect a wire ejection assisted by other abutment plates 17a (which have not participated in the length detection).

Figure 8:
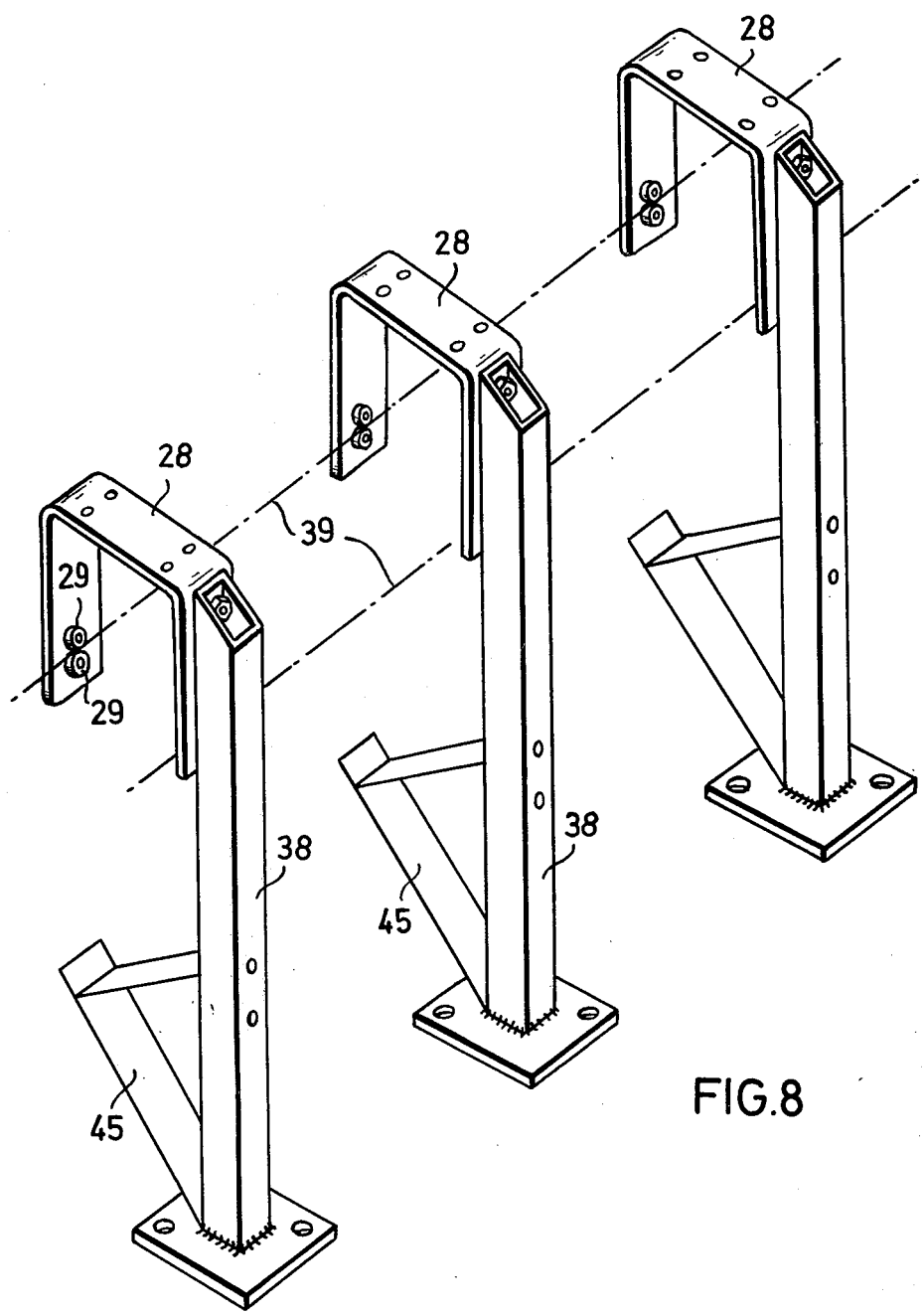
FIG. 8 is a perspective view of a further detail of the machine stand.

While in principle the wire channel may be secured to any convenient type of stand, in FIGS. 7 and 8 a particularly advantageous support stand is shown. The yokes 28–in case the wire channel is formed of a plurality of length portions, a separate yoke 28 is provided in the zone of the parting plane between the length portions—are attached to respective posts 38 which are arranged in an aligned series. The wire channel which is indicated in FIG. 8 only with the dash-dot lines 39 and which may be of the structure shown in FIG. 5, is supported between the two rollers 29 carried by each downwardly oriented legs of each yoke 28.

In order to ensure that even in case of a relatively long wire channel the arrangement is rigid, the yokes 28 are interconnected by a sheet-metal head plate 40 which couples either two adjoining yokes 28 with one another or extends over a greater number of serially-arranged yokes 28. The head plate 40 is fixedly tightened to the transverse part of each yoke 28. The longitudinally extending edges 41 of the head plate 40 are bent outwardly in a hook-like manner so that in the upwardly oriented trough-shaped channels, lateral panel members 42, 42' may be hooked. It is noted that in FIG. 5 only the right-hand lateral panel member 42' is shown. While the yoke at one leg is fixedly bolted to the associated post 38 and the lateral panel member 42 on that side is affixed firmly between the yoke and the bracket, the lateral panel 42' disposed at the other yoke leg is detachably arranged. The upper edge of each lateral panel is hooked into the trough-like channel at the edges 41 of the head plate 40, while at least in case of the detachable lateral panel 42, the lower free edge 43 is also bent in a hook-like manner so that the latter, after hooking the panel 42' into the trough-shaped channel of the head plate 40, is snapped below the lower free end of the yoke 28 and is then secured thereto by an attaching means 44, such as a screw, a cotter pin or the like. This structure makes possible to suspend the entire wire channel from a plurality of individual posts 38. The head plate 40 fixedly connected with the yokes 28 and the form-lockingly secured lateral panels 42, 42' together ensure an overall rigid structure. By removing one or several lateral panels 42', a zonewise access to the wire length detecting elements (such as light barriers, sensors or magnetically operated abutment plates) may be obtained. It is expedient to secure rack members 45 to each post 38 underneath the wire channel for catching the severed length portions of the wire as they are discharged from the wire channel. The accumulated wire lengths may be periodically removed from the rack members 45 by appropriate material moving means.

Instead of individual posts 38, the yokes 28 may be secured to a continuous overhead girder so that the wire channel is, along its entire length, supported by suspension. Thus, underneath the wire discharge device, free space is available for any desired transverse displacement of the wire or for accommodating conveying means, sorting devices or the like.

It is to be understood that the controls 11 or 19 are conventional arrangements such as relays which respond to signals received from the length detecting devices 8, 9 or the switch 18, respectively, and which effect energization or de-energization of the drives associated with the cutting device and the wire channel. Further, a separate drive for the closing strips 34 may be a conventional electric or hydraulic power device energizable for example, by the control 11 or 19 or by a separate conventional relay arrangement.

Turning now to FIG. 9, there is illustrated an example of a length adjustable coupling member 15 which comprises a rod having a threaded end 46 and another end (not shown) coupled in a conventional manner to the cutting device. The coupling member 15 further comprises an internally threaded sleeve 47 which is coupled with its other end (not shown) to the wire channel in a conventional manner. The threaded ends of the rod and the sleeve are in a threaded engagement and are locked by a nut 48. For adjusting purposes the nut 48 is loosened and then the sleeve 47 is rotated to lengthen or shorten the coupling member to set the exact distance between the cutting device and the wire channel. If the desired distance is obtained, the nut 48 is again fastened.

It will be understood that the above description of the present invention is susceptible to various modifications, changes and adaptations, and the same is intended to be comprehended within the meaning and range of equivalents of the appended claims.

What is claimed is:

1. In a wire cutting machine for consecutively severing predetermined wire lengths from a continuously advanced wire of indefinite length, including a wire cutting device and a wire discharge device arranged downstream of the wire cutting device when viewed in the direction of wire advance; the wire discharge device having a wire channel into which the wire is advanced; the wire channel having a wall defining an elongated channel space oriented in the direction of wire advance and having an open side along the length of the wire channel; closing means for closing the open side of the wire channel prior to each wire cutting operation and for uncovering the open side upon each cutting operation for removal of the severed wire length transversely to the direction of wire advance; length detecting means for sensing a predetermined length of the leading wire portion advanced in the wire channel; control means connected with the length detecting means, the cutting device and the closing means for operating the cutting device and the closing means upon receipt of a signal from the length detecting means; wherein the improvement comprises means defining a plurality of discrete openings provided in the wall of the wire channel in a series extending in the length dimension of the wire channel; said openings being arranged at predetermined distances from one another; said length detecting means being operatively connectable with said channel space through selected ones of said discrete openings.

2. A wire cutting machine as defined in claim 1, further comprising a length-adjustable coupling member connecting said wire channel with said cutting device for varying the distance between said wire channel and said cutting device.

3. A wire cutting machine as defined in claim 1, wherein said wire channel is formed of a plurality of longitudinally serially attached length portions.

4. A wire cutting machine as defined in claim 1, wherein said discrete openings are slots extending transversely to the length dimension of the wire channel; said length detecting means is constituted by an abutment member insertable into a selected one of said slots for blocking the path of travel of the wire in said wire channel at a selected distance from the cutting device.

5. A wire cutting machine as defined in claim 4, wherein said length detecting means comprises a separate abutment member associated with each said slot; means for displaceably supporting each abutment member; each abutment member having a withdrawn position in which it is clear of said path of travel and an advanced position in which it blocks said path of travel by projecting thereinto through the slot with which it is associated; and separate setting means coupled to each respective abutment member for setting it into one of said positions.

6. A wire cutting machine as defined in claim 4, further comprising
(a) support means for longitudinally displaceably supporting said wire channel;
(b) a drive means connected to said wire channel for effecting a longitudinal reciprocation thereof; and
(c) impact sensing means connected to said wire channel and said drive means for operating said drive means to displace said wire channel in the direction of wire advance upon emission of a signal of said impact sensing means in response to an impact between a leading end of the wire and the abutment member blocking said path of travel.

7. A wire cutting machine as defined in claim 1, further comprising support means for longitudinally displaceably supporting said wire channel.

8. A wire cutting machine as defined in claim 7, further comprising a drive means connected to said wire channel for effecting a longitudinal reciprocation thereof; and actuating means operatively connecting said length detecting means to said drive means for operating said drive means to displace said wire channel in the direction of wire advance upon emission of said signal by said length detecting means.

9. A wire cutting machine as defined in claim 7, further comprising a coupling member connecting said wire channel with said cutting device for unison longitudinal movement therewith.

10. A wire cutting machine as defined in claim 9, wherein said coupling member is length-adjustable for varying the distance between said cutting device and said wire channel.

11. A wire cutting machine as defined in claim 1, wherein said closing device comprises at least one closing strip; strip support means for positioning said closing strip along said open side of said wire channel; said closing strip having an operative position in which it closes off said open side and an inoperative position in which said open side is uncovered; and strip actuating means for operating said closing strip.

12. A wire cutting machine as defined in claim 11, wherein said wire channel and said closing strip are formed of a plurality of serially attached length portions.

13. A wire cutting machine as defined in claim 11, wherein said strip support means comprise at least two pivotal levers secured to said closing strip.

14. A wire cutting machine as defined in claim 13, wherein said pivotal levers are secured to said wall of said wire channel; at least one end of said closing strip being connected with said strip actuating means.

15. A wire cutting machine as defined in claim 14, wherein said strip actuating means is a separate power device operatively connected to said length detecting means to be energized when said length detecting means responds.

16. A wire cutting machine as defined in claim 1, further comprising a stand for supporting said wire channel; said stand including a plurality of longitudinally spaced yokes generally of inverted U shape; said yokes straddling and carrying said wire channel.

17. A wire cutting machine as defined in claim 16, wherein each yoke has downwardly oriented legs; further comprising at least one support roller mounted on each yoke leg for longitudinally displaceably supporting said wire channel.

18. A wire cutting machine as defined in claim 16, wherein said stand further comprises a plurality of spaced, yoke supporting posts each being attached to a leg of a separate one of said yokes and each being supported by a foundation.

19. A wire cutting machine as defined in claim 18, wherein said wire channel is formed of a plurality of longitudinally serially attached length portions; the distance between each post corresponding to the length of the respective length portions supported by the respective posts.

20. A wire cutting machine as defined in claim 16, further comprising a head plate interconnecting a plurality of consecutive yokes; each yoke having a transverse web portion affixed to said head plate.

21. A wire cutting machine as defined in claim 20, wherein said head plate has opposite edge portions extending parallel to the length dimension of said wire channel; said edge portions being bent outwardly and upwardly to form troughs.

22. A wire cutting machine as defined in claim 21, further comprising side panels having a trough-like edge portion hooked into the respective troughs of said head plate; said side panels being secured to said yokes.

* * * * *